United States Patent [19]

Robins et al.

[11] 4,298,857
[45] Nov. 3, 1981

[54] BRAKE WEAR INDICATOR SYSTEM

[75] Inventors: Ronald F. Robins, Southend-on-Sea; Jaan Lindre, Benfleet, both of England

[73] Assignee: Ford Motor Company, Dearborn, Mich.

[21] Appl. No.: 117,898

[22] Filed: Feb. 1, 1980

[51] Int. Cl.³ .................................. B60T 17/22
[52] U.S. Cl. .......................... 340/52 A; 200/61.4
[58] Field of Search ................. 340/52 A, 52 B; 200/61.4, 61.41, 61.44; 188/1 A

[56] References Cited

U.S. PATENT DOCUMENTS

| | | | |
|---|---|---|---|
| 3,882,448 | 5/1975 | Shibatani et al. | 340/52 A |
| 4,016,533 | 4/1977 | Ishikawa et al. | 340/52 A |
| 4,188,613 | 2/1980 | Yang et al. | 340/52 A |

Primary Examiner—Alvin H. Waring
Attorney, Agent, or Firm—Steven L. Permut; Clifford L. Sadler

[57] ABSTRACT

A brake wear indicator system includes a brake pad having a support plate, a layer of friction material secured thereto and an electrical contact assembly which extends through the support plate to project into the layer of friction material and which comprises two terminal portions electrically insulated from each other and a connecting portion which electrically connects the terminal portions and is located wholly within the layer of friction material. The connecting portion is arranged to be exposed and abraded after prolonged abrasion of the friction material by contact with a braking surface whereby electrical contact between the terminal portions is broken. The contact assembly is connected to an electrical indicator circuit which produces a first warning signal when the layer of friction material has become abraded sufficiently to allow electrical contact between the connecting portion of the associated braking surface, and a second warning signal when the connecting portion has become sufficiently abraded to break the electrical connection between the terminal portions of the contact assembly.

6 Claims, 5 Drawing Figures

BRAKE WEAR INDICATOR SYSTEM

BACKGROUND OF THE INVENTION

1. Field of the Invention

This invention relates to brake pads and more particularly to brake pads with a wear indicating device incorporated therein.

2. Description of the Prior Art

Conventional brake pads for motor vehicles include a support plate operably connected to an actuating mechanism and a layer of friction material, commonly referred to as a brake lining, carried on a face of the support plate and shaped to conform to a braking surface such as a brake disc or drum.

The friction material wears out through frictional contact with the braking surface and needs to be periodically replaced. If the friction material wears through, the support plate rubs against the braking surface and can damage the braking surface. Consequently, it is desirous to provide a warning signal when the friction material is worn thin. It is known to incorporate an electrical contact in the brake pad which contacts the braking surface when the friction material has worn to a dangerously low level thereby allowing activation of an electrical warning device such as a warning lamp on an instrument panel.

It is also known to position noise generating discs between the friction material support plate to create a warning signal.

The presently known warning devices generate only one single warning signal so that the operator of the vehicle has no indication as to the urgency with which the brake pad requires replacement. Additionally, the present electrical devices can be disabled in the event that the electrical leads to the contact become broken.

A warning system is needed that produces a first signal and a second distinct signal indicating a greater urgency for brake maintenance.

SUMMARY OF THE DISCLOSURE

According to one embodiment of the invention, a brake wear warning system includes a brake pad operably engageable to a brake rotor. The brake pad includes a support plate, a layer of friction material secured on a face of the support plate and having a face engageable to the brake rotor, and an electrical contact assembly extending through the support plate and projecting into a plane which intersects the layer of friction material and is substantially parallel to the face engaging the rotor.

The electrical contact assembly has a first and second terminal portion connected to an electric circuit. Each terminal portion is insulated from the other with one terminal operably connected to a power supply and the other operably grounded. A circuit test switch is operably incorporated in the electric circuit between the second terminal and ground. An electrically operated indicator is incorporated in the circuit between the power supply and the first terminal.

A connecting portion electrically connects one terminal to the other terminal. The connecting portion is located wholly within planes which intersect the layer of friction material and are substantially parallel to the support plate such that, after sufficient abrasion of the friction material, the connecting portion becomes exposed to make contact with the brake rotor when the brakes are applied whereby electrical contact between the first terminal portion and the brake rotor is made.

Preferably, the terminals of the contact assembly are formed integrally with the connecting portion from a block of electrically conductive material such as graphite. A bifurcation extends along the length of the block to form the two terminal portions. The block is mounted in an aperture in the support plate with the bifurcation extending into a plane containing the friction material. A sheet of electrically insulating material, such as ceramic or plastic, is received in the slot to insulate one terminal from the other and projects laterally from the block into engagement with grooves at the edge of the aperture of the supporting plate to nonrotatably retain the block in the aperture.

Desirably, electrical connection is made between the contact assembly and electric circuit by means of a plug removably mounted on the rear face of the supporting plate.

In the one embodiment, a plurality of electrical contact assemblies may be electrically connected in series with the circuit test switch and the indicator, such as a lamp bulb located in the vehicle instrument panel, so that the indicator is activated when the test switch is closed. After sufficient abading of the friction material, the connecting portion makes electrical contact with the braking surface when the brakes are applied to actuate the indicator, thereby producing the first signal indicating a need for brake lining maintenance. Upon further abrading of the friction material, the indicator fails to be activated by closure of the test switch because the electrical connection between the two terminal portions of the contact assembly through the connecting portions is broken thereby opening the electric circuit. The failure of the indicator to be actuated when the test switch is closed is the second distinct signal indicating immediate maintenance.

More generally, according to the invention, a brake warning system includes a brake pad with a friction engaging material engageable to a brake rotor and a signal device for producing a first warning signal when the friction material has been abraded a certain amount and a second signal when the friction material has been abraded a further predetermined amount beyond the point where the first warning signal was produced.

In this fashion a brake warning system produces two distinct signals indicating the urgency in which the brake pad linings need maintenance.

BRIEF DESCRIPTION OF THE DRAWINGS

A preferred embodiment of the invention will now be described with reference to the accompanying drawings in which.

DETAILED DESCRIPTION OF THE PREFERRED EMBODIMENTS

Figure 4:
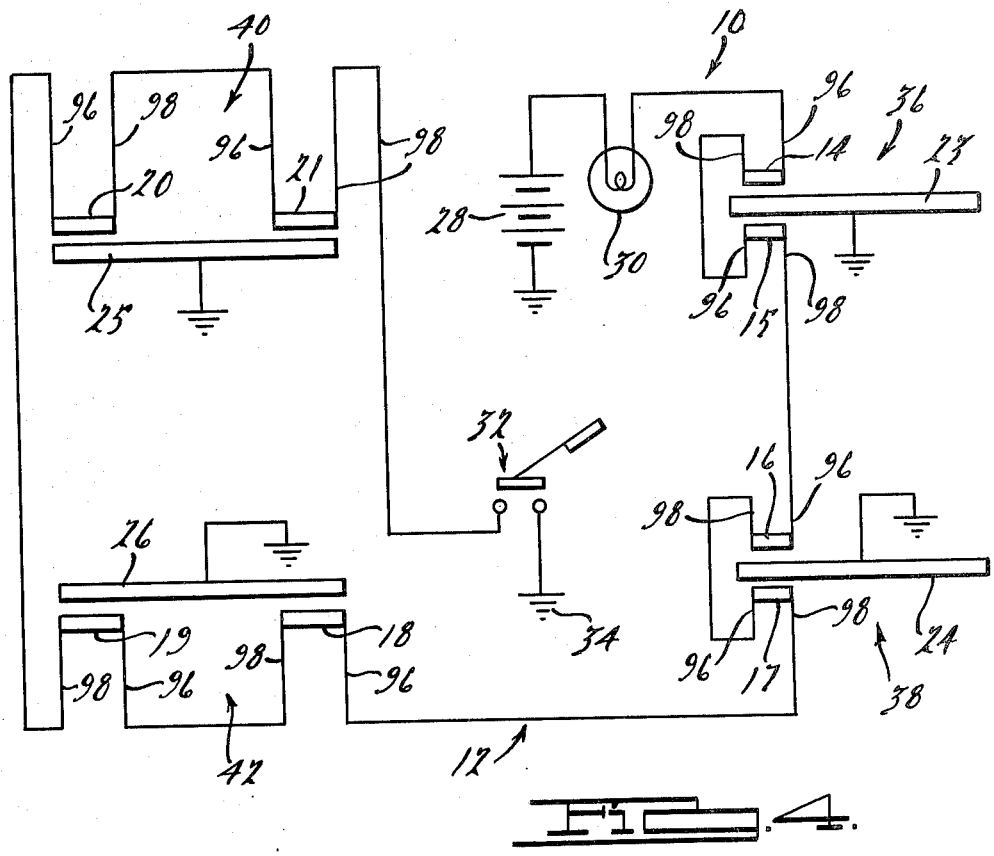
FIG. 4 is a schematic of a circuit for a brake warning system in accordance with the invention.

Referring to the figures, particularly FIG. 4, a motor vehicle (not shown) has a brake wear indicator system 10, which includes an electric circuit 12, a plurality of brake pads 14-21 operationally positioned adjacent electrically grounded rotors 23, 24 and drums 25, 26 respectively. Each pad is electrically connected as specifically discussed below in series to each other. A power source 28, for example a battery, is electrically connected at one end of the circuit 12 with an indicator lamp 30 positioned between the power source 28 and first pad 14 in the series. A test switch 32 is positioned in the circuit 12 between the ground 34 and the last pad 21 in the series.

Figure 1:
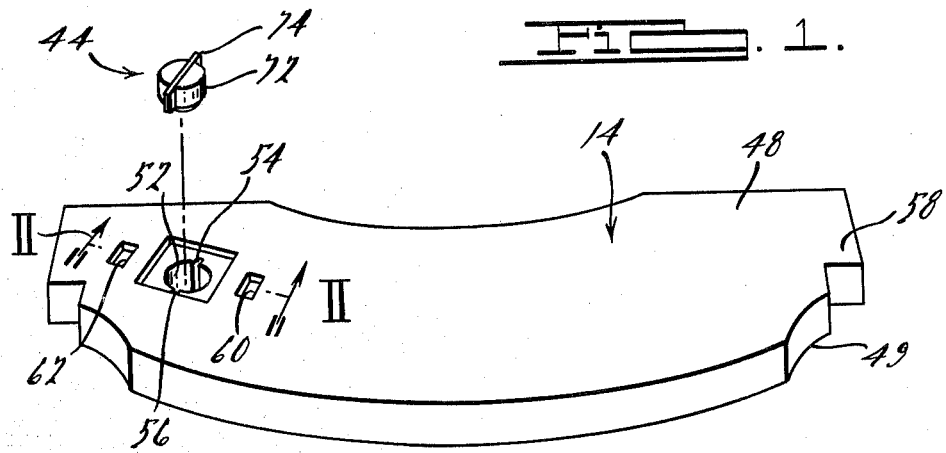
FIG. 1 is an exploded perspective view of part of a disc brake pad in accordance with the invention.

Pads 14, 15, 16 and 17 are constructed for operation in a disc brake assemblies 36 and 38 and are similarly constructed to each other besides the fact of being left or right handed. Pads 18, 19, 20 and 21 are constructed for operation in drum brake assemblies 40 and 42. Each pad has a contact assembly 44 as shown in FIG. 1 assembled in the pad. Since a contact assembly 44 is assembled in the same fashion to each pad, reference will be made only to pad 14 shown in FIGS. 1, 2, and 3.

Figure 2:
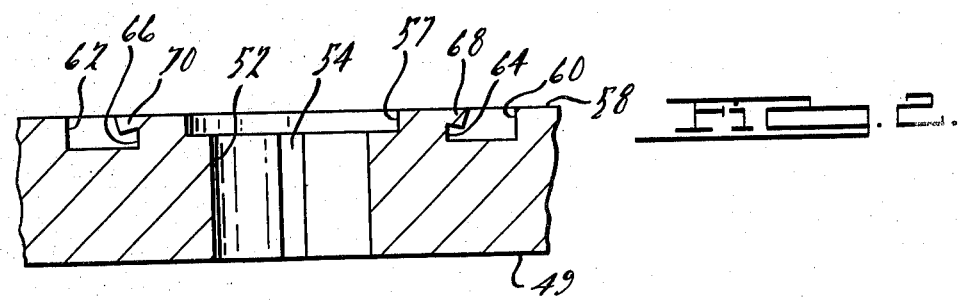
FIG. 2 is an enlarged fragmentary cross-sectional view of the support plate taken along line II—II of FIG. 1.
Figure 3:
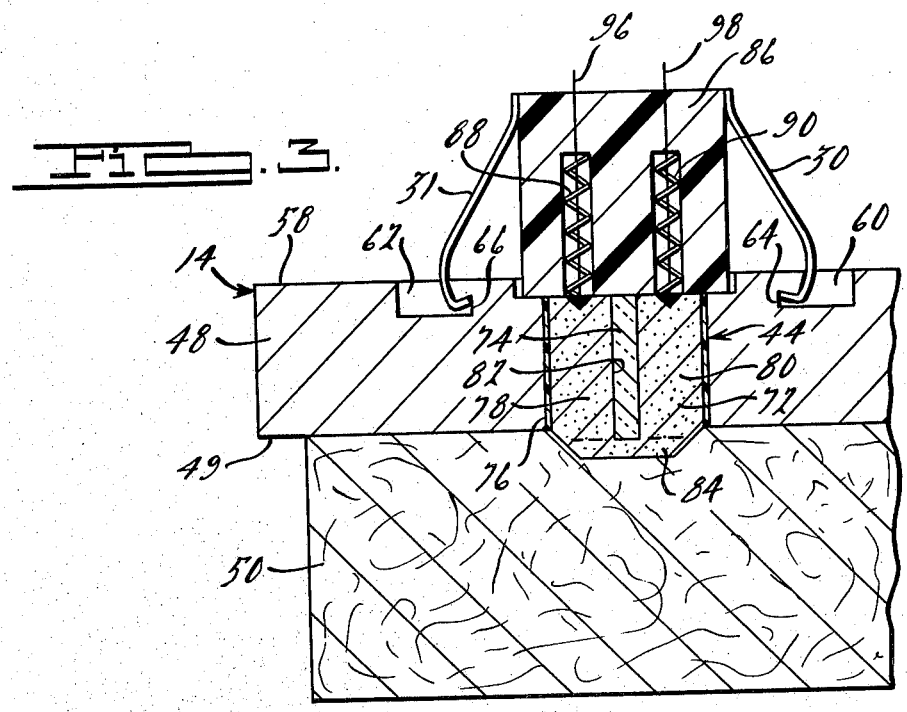
FIG. 3 is a similar cross-sectional view to FIG. 2 showing an assembled disc brake pad.

As shown in FIG. 3, brake pad 14 includes a steel support plate 48 and a layer of friction material commonly referred to as a brake lining 50 of conventional composition secured to its front face 49. An aperture 52 having two opposing grooves 54 and 56 extends through plate 48 and is sized to receive contact assembly 44. A square counter-bore 57 about aperture 52 extends through the rear face 58 of plate 48. In addition, the rear face 58 has two recesses 60 and 62 at opposing edges of counter-bore 57. Each recess 60 and 62 has an undercut portion 64 and 66 under flanges 68 and 70 respectively as shown in FIGS. 2 and 3.

The contact assembly 44 includes a generally cylindrical graphite block 72, a ceramic insert plate 74, and insulating coating 76 coated about block 72. The graphite block 72 is molded to form two integral terminal portions 78 and 80 with a slot 82 therebetween. An integral chamferred disc shaped connecting portion 84 spans the slot 82 and electrically connects terminal portion 78 to terminal portion 80. The ceramic insert plate 74 fits within slot 82 to maintain the electrical separation between terminal portions 78 and 80. The ceramic insert plate 74 radially extends out from graphite block 72 to engage grooves 54 and 56.

In an alternative embodiment, the insulating coating may be sprayed or otherwise secured onto the plate 48 within aperture 52 and about the faces 49 and 58 of plate 48 about the aperture 52.

The contact assembly 44 is positioned in the plate 48 such that the connecting portion 74 of the block 16 projects from the front face of the plate 48 and, as seen in FIG. 3, lies wholly within the layer of brake lining 50. The pad 14 may be conveniently manufactured by first forming the plate 48 with the aperture 52 and recesses 60 and 62, coating the surfaces of the aperture 52 (and/or the surfaces of the block 16) with the insulating coat 76, inserting the block 72 and the plate 74 into the aperture 52 and molding the brake lining 50 onto the front face 49 of the plate 48.

Electrical connections are made to the contact assembly 44 by means of a plug 86, which carries two spring-loaded contacts 88 and 90 which engage terminal portions 78 and 80 respectively of block 72. The plug 86 is mounted on the rear face 58 of the place 48 by means of spring clips 92 and 94 which engage in the undercut portions 64 and 66 of recesses 60 and 62 respectively. The spring loaded contacts 88 and 90 are respectively connected to power lead line 96 and ground lead line 98.

As shown in FIG. 4, the ground lead line 98 of the first brake pad 14 in the series is operably connected to the power lead line 96 of the next brake pad 15 in the series which has its ground lead line 98 connected to the next power lead line 96 and so forth until the last brake pad 21 has its ground lead line 98 operably connected to test switch 32.

OPERATION

In operation, the brake pads 14-21 are installed in conventional disc or drum brake assemblies 36, 38, 40 and 42 in the normal manner and operate in a normal fashion against the brake rotors 23 and 24 or drums 25 and 26. If the driver wishes to test if the lamp 30 is in working order he closes test switch 32 which closes circuit 12 to illuminate the lamp.

As the brake linings 50 on the brake pads becomes worn away, the connecting portions 20 of the contact assemblies will become exposed. If the brakes are applied with a brake in this condition, the contact assembly 44 will make electrical connection with one or more of the electrically grounded rotors or drums 23, 24, 25 or 26. This completes an electrical circuit through the lamp 30 and generates a first warning signal when the brakes are actuated indicating that one of the brake pads has worn to a minimal level and will require replacement at the first opportunity.

As the worn brake lining 50 continues to wear, the connecting portion becomes completely abraded and the electrical connection between the two terminal portions 78 and 80 becomes severed. In this condition, closure of the test switch 32 by operation of the driver no longer causes the lamp 51 to illuminate, thus giving a second more urgent signal indicating that one of the brake pads has worn to an extremely thin amount. The lamp 51 still continues to be illuminated when the brakes are applied by contact of terminal 78 with the brake rotor or drum. In the event that one of the leads to the contact assemblies 44 or the switch 32 becomes broken, the lamp 30 is not illuminated neither when the switch 32 is closed nor when the brakes are applied. This condition therefore indicates the system is in non-working order.

SECOND EMBODIMENT

Figure 5:
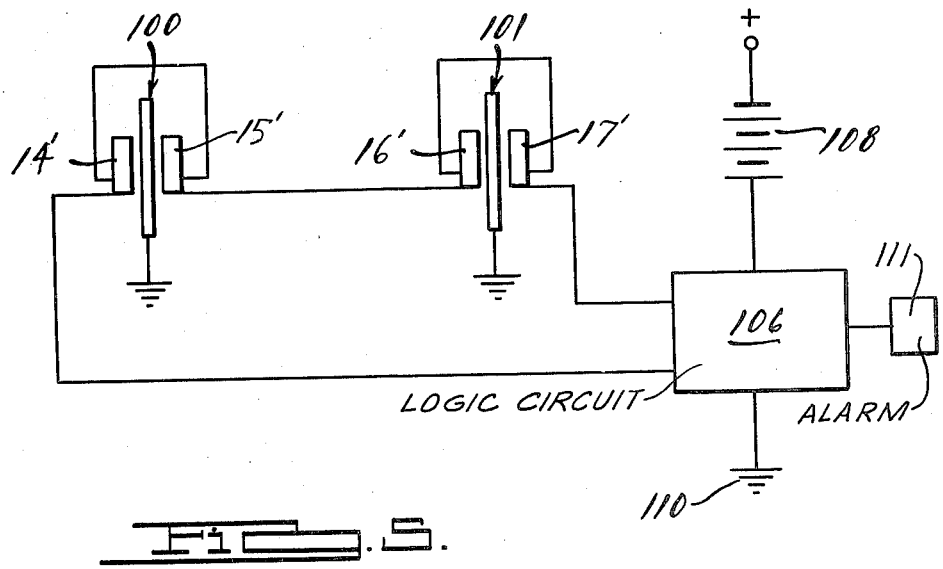
FIG. 5 is a schematic of a second circuit for a second embodiment of a brake warning system in accordance with the invention.

FIG. 5 illustrates an alternative circuit using the same contact assemblies 44 for a series of motor vehicle brakes 100, 101 (only two brakes illustrated for simplification of the drawing) fitted with brake pads 14' 15' 16' 17' as described for the first embodiment shown in FIGS. 1-4. In this arrangement the contact assemblies of the brake pads are connected in series with a logic circuit 106 which detects fluctuations in potential between a power source 108 and ground 110 caused on the one hand by contact of the connecting portions of one of the brake pads with its associated braking surface when the connecting portion 84 is first exposed and comes in contact with the grounded brake rotor 100 or 101 and on the other hand, breaking of the electrical contact between the terminal portions of the contact assembly 44 when one of the connecting portions 84 is totally abraded away. The two detectable voltage levels are used to trigger an alarm 111 to give appropriate warning to the vehicle driver. For example, the warning may be in the form of a flashing light when the connecting portion is first exposed and in contact with the grounded brake rotor, and in the form of a steady warning light when the connecting portion has been totally abraded away.

Variations and modifications of the present invention are possible without departing from its scope and spirit as defined by the appended claims.

The embodiments of the invention in which an exclusive property or privelege is claimed are defined as follows:

1. A motor vehicle brake warning system including a brake pad comprising:
   a layer of friction material having a face operably engageable to a braking surface;
   signal means operably embedded in said friction material for producing a first warning signal when the layer of friction material has abraded a predetermined amount and a second distinctive warning signal when the layer of friction material has further abraded beyond said predetermined amount;
   said signal means comprising:
     an electrical contact embedded in part into the layer of friction material such that said electrical contact comes in contact with an electrically grounded braking surface when said layer of friction material has abraded said predetermined amount and said brake pad is applied to said braking surface;
     an electric circuit connectable to said electrical contact and being actuated when said electrical contact comes into contact with said braking surface to produce said first signal;
   said electrical contact comprising:
     two terminal portions electrically insulated from each other;
     a connecting portion electrically connecting the two terminal portions;
     said connecting portion being located wholly embedded within said layer of friction material such that said connecting portion comes into contact with the braking surface when said brake pad is applied to said braking surface after said layer of friction material has abraded a predetermined amount to produce said first signal, and said connecting portion becomes totally abraded when said layer of friction material has further abraded beyond said first predetermined amount to electrically disconnect said first terminal portion from said second terminal portion to produce said second signal.

2. A brake warning system as defined in claim 1 wherein said electric circuit comprises a test switch and an indicator such that the indicator is actuated either when the test switch is closed, or when the connecting portion of the contact assembly makes contact with the braking surface to produce said first signal, and the indicator remains deactuated by the closure of the test switch when the connecting portion is totally abraded to produce said second signal.

3. A brake pad comprising:
   a support plate with an aperture therethrough;
   a layer of friction material secured to said support plate and having a face engageable to a braking surface;
   an electrical contact assembly extending through said aperture of said support plate and connected to said support plate;
   said electrical contact assembly includes two electrically insulated terminal portions extending through said support plate an integral connecting portion electrically connecting said terminal portions;
   said connecting portion extending into a plane intersecting the layer of friction material and substantially parallel to the face engaging the braking surface such that upon a predetermined amount of abrasion of said face of the layer of friction material, said connecting portion comes in contact with said braking surface when said pad is applied to said braking surface to close a first electric circuit connectable to said electrical contact assembly and produce a first signal, and upon a further amount of abrasion of said braking surface beyond said predetermined amount, said connecting portion becomes totally abraded to electrically disconnect said terminal portions to electrically disconnect said first terminal portion from said second terminal portion to produce a second signal.

4. A brake pad as defined in claim 3, wherein said connecting portion being located wholly embedded within said layer of firction material.

5. A brake pad comprising:
   a support plate with an aperture therethrough;
   a layer of friction material secured to said support plate and having a face engageable to a braking surface;
   an electrical contact assembly extending through said aperture of said support plate and connected to said support plate;
   said electrical contact assembly includes two electrically insulated terminal portions extending through said support plate an integral connecting portion electrically connecting said terminal portions;
   said connecting portion extending into a plane intersecting the layer of friction material and substantially parallel to the face engaging the braking surface such that upon a predetermined amount of abrasion of said face of the layer of friction material, said connecting portion comes in contact with said braking surface when said pad is applied to said braking surface, and upon a further amount of abrasion of said braking surface beyond said predetermined amount, said connecting portion becomes totally abraded to electrically disconnect said terminal portions;
   the contact assembly comprising:
     a block of electrically conductive material bifurcated to form said two terminal portions by a slot extending therein with said integral connecting portion spanning the slot;
     a sheet of insulating material positioned in said slot between the terminal portions and projecting laterally from the block;
     said aperture through said support plate having opposing recesses sized to receive the projecting ends of said sheet of insulating material.

6. A brake pad as defined in claim 5, wherein said connecting portion being located wholly embedded within said layer of friction material.

* * * * *